United States Patent [19]
Fisher

[11] Patent Number: 6,059,159
[45] Date of Patent: May 9, 2000

[54] UTILITY RACK ADAPTER BRACKET

[76] Inventor: Thomas L. Fisher, 25131 Circle Dr., Southfield, Mich. 48075

[21] Appl. No.: 09/268,295

[22] Filed: Mar. 15, 1999

[51] Int. Cl.[7] ....................................................... B60R 9/00
[52] U.S. Cl. ........................... 224/403; 224/405; 224/309; 224/331; 296/3; 296/100.16
[58] Field of Search ..................................... 224/403, 405, 224/309, 321, 329, 331, 545, 547; 296/3, 100.16, 100.17, 100.18

[56] References Cited

U.S. PATENT DOCUMENTS

| | | | |
|---|---|---|---|
| 4,717,055 | 1/1988 | San Juan | 224/331 X |
| 4,721,239 | 1/1988 | Gibbs, III et al. | 224/331 X |
| 4,773,575 | 9/1988 | Morrison, III | 224/405 |
| 4,778,092 | 10/1988 | Grace | 224/331 |
| 5,014,890 | 5/1991 | Perry . | |
| 5,092,504 | 3/1992 | Hannes et al. . | |
| 5,139,375 | 8/1992 | Franchuk | 296/100.18 X |
| 5,152,574 | 10/1992 | Tucker . | |
| 5,261,719 | 11/1993 | Tucker . | |
| 5,301,995 | 4/1994 | Isler . | |
| 5,443,190 | 8/1995 | Cucheran et al. . | |
| 5,494,327 | 2/1996 | Dercktor | 224/405 X |
| 5,553,652 | 9/1996 | Rushford . | |
| 5,560,576 | 10/1996 | Cargill | 224/331 X |
| 5,584,521 | 12/1996 | Hathaway et al. . | |

*Primary Examiner*—Gregory M. Vidovich
*Attorney, Agent, or Firm*—Vanophem Meehan & Vanophem, P.C.

[57] ABSTRACT

A utility rack adapter bracket for use with a rail assembly installed on the top of a pickup truck bed. The bracket allows a rack, such as ones manufactured by Yakima® or Touly®, to be attached above the truck bed when covered or uncovered. The bracket is intended for use with a rail assembly as set forth in U.S. Pat. Nos. 5,152,574 and 5,261,719 (Tucker).

20 Claims, 5 Drawing Sheets

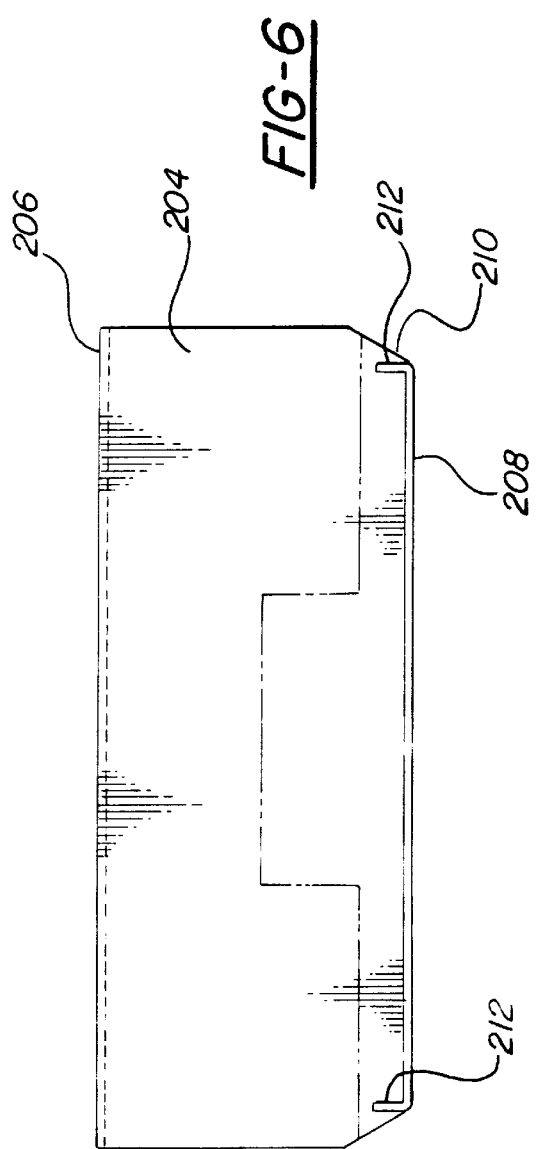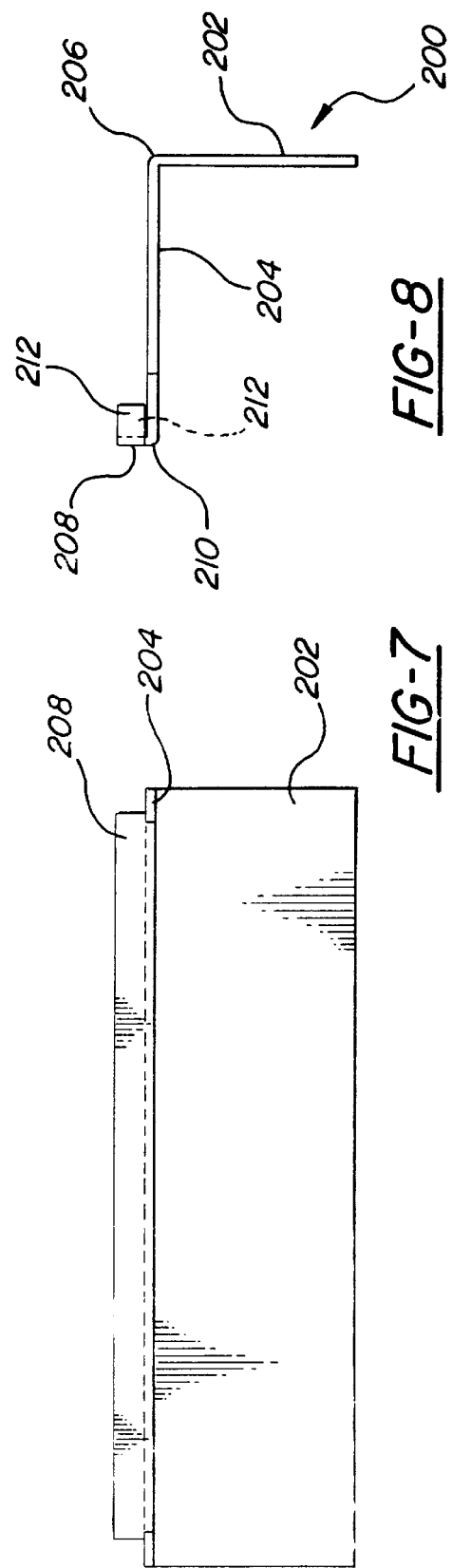

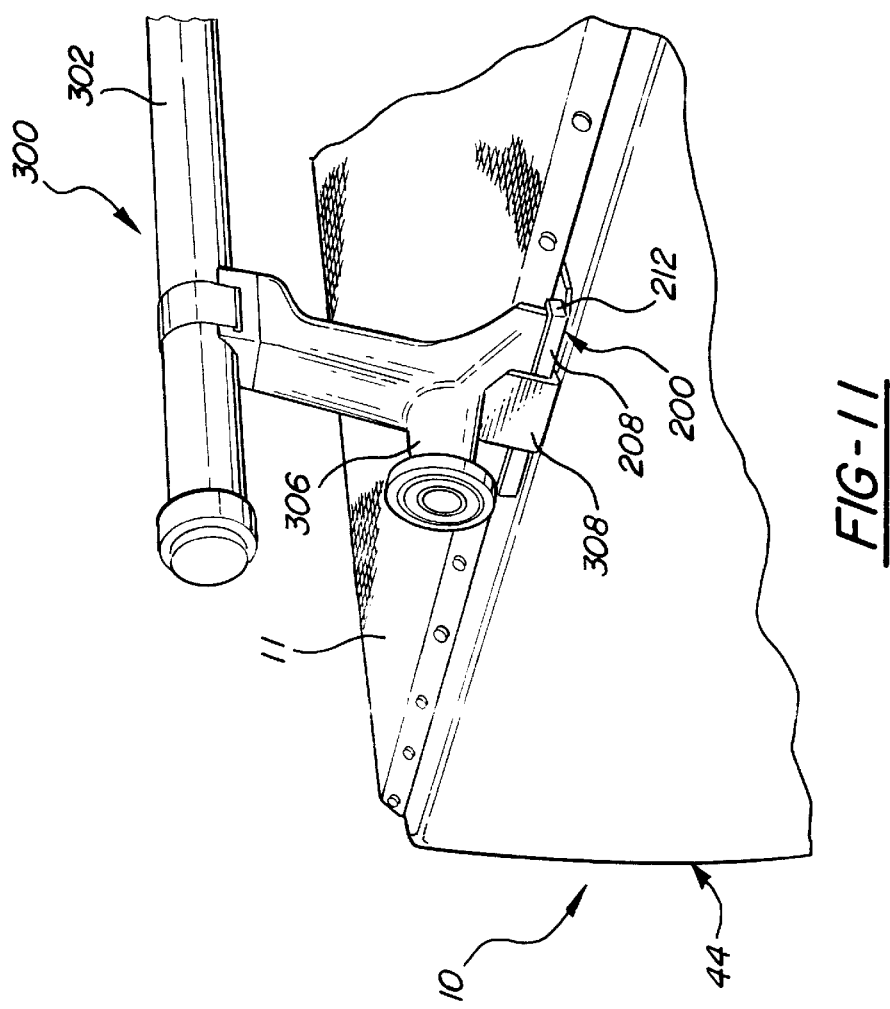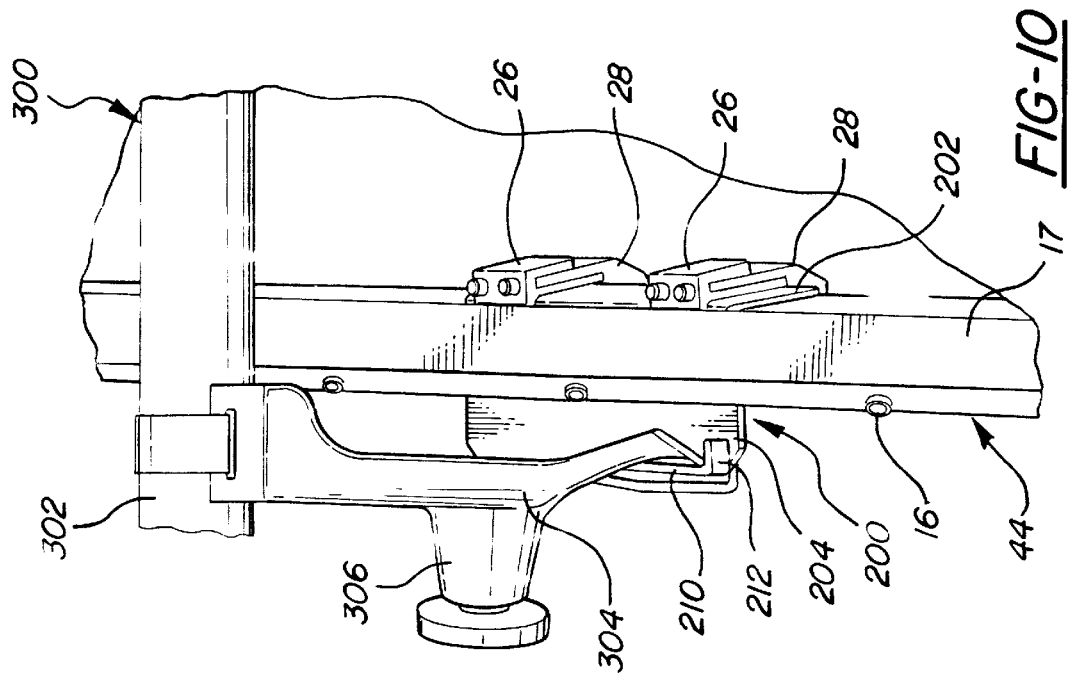

UTILITY RACK ADAPTER BRACKET

BACKGROUND OF THE INVENTION

1. Field of the Invention

The present invention relates to a utility rack adapter bracket. More particularly, the present invention relates to a bracket for use with a rail assembly installed on the top of a pickup truck bed. The bracket allows a rack, such as ones manufactured by Yakima® or Touly®, to be attached above the truck bed when covered or uncovered. The bracket is intended for use with a rail assembly as set forth in U.S. Pat. Nos. 5,152,574 and 5,261,719 (Tucker).

2. Description of the Prior Art

U.S. Pat. No. 5,152,574, to Tucker, discloses an apparatus for attaching a cover for an open-topped vehicle enclosure. In Tucker '574, rails are removably attached to the tops of the side walls of a truck bed. The periphery of a cover can be attached to the rails to cover the truck bed.

U.S. Pat. No. 5,261,719, to Tucker, is a continuation-in-part of Tucker '574, and is directed to an apparatus for attaching a cover for an open-topped vehicle enclosure, with an optional cargo carrier. Cargo support members are attachable between opposing rail members to carry items, such as skis, bicycles, and the like. The cargo support members include accessory bars that span the opposing rail members and attach to the rails. The accessory bar bolts through an accessory adapter insert and to an accessory clamp member.

The cargo support of Tucker '719 is designed to support cargo, such as a bicycle, by utilizing further hardware. For bicycles the hardware includes channels that bolt to the accessory bars. Tucker '719 has no provision for employing existing racks, such as ones manufactured by Yakima® or Touly®, in combination with the bed cover assembly. FIGS. 9–11, discussed below with regard to the preferred embodiment of the invention, show a utility rack 300 which corresponds to a Yakima® rack as disclosed in U.S. Pat. Nos. 4,524,893; 4,877,169; and 5,820,002.

U.S. Pat. No. 5,584,521, to Hathaway et al., discloses a utility rack similar to Tucker '719. The device of Hathaway et al. allows a bicycle rack to be attached to a bed cover assembly. In order to accommodate the bicycle rack with the modular rail system, dovetailed projections are provided on the bottom of the bicycle rack. The dovetailed projections fit into corresponding dovetailed recesses in the modular rail system. As is the case with Tucker '719, Hathaway et al. does not permit the use of existing bicycle racks, such as ones manufactured by Yakima® or Touly®, to be employed with the modular rail system, without necessitating major reconstruction to clamp the bicycle rack to the modular rail system.

Both Tucker '719 and Hathaway et al. require racks specifically designed for use with their bed covering systems, and do not contemplate the use of existing racks with their systems.

Any attempt to utilize an existing bicycle rack with either the Tucker '719 or Hathaway et al. assembly would require complicated reconstruction.

The Tucker '719 apparatus is shown in FIGS. 1–5B. The apparatus is designed to attach to the truck bed 19 of a pickup truck 10, and allows for enclosure by a cover 11. A rail system 13 attaches to the top of the side walls of the truck bed 19. The rail system 13 is made up of rail members 17, which includes snap members 16, corner members 18, upper clamp members 26, and lower clamp members 28. Bolts 30, thumbscrews 24, and setscrews 25 are provided to hold the various parts together.

The rail members 17 are formed with an assembly channel 20, that has a substantially L-shape. The corner members 18 are located at the ends of the rail members 17, to thereby join perpendicular rail members 17 together. Each corner member has a central portion 21 and attachment member s 22. The attachment members 22 have an L-shaped cross section corresponding to the L-shape of the assembly channel 20, to thereby provide a close fit.

As shown in FIG. 4, the corner members 18 are secured to the rail members 17 with the thumbscrews 24 or setscrews 25 extending through blind bores 23. The thumbscrews 24 or setscrews 25 bear against the attachment members 22 creating a greater friction fit between the attachment members 22 and the assembly channel 20.

The upper clamp member 26, best shown in FIG. 2, has a bolt aperture or bore 27. The lower clamp member 28 has a threaded bore 29, and the clamp bolt 30 connects the two members. Referring to FIGS. 2 and 3, the upper clamp member 26 has an outwardly extending arm 37 which slidingly fits closely within at least a lower portion of the assembly channel 20 in the rail member 17. The upper clamp member 26 also has a longer downwardly extending wall 38 and a shorter downwardly extending wall 39. The longer downwardly extending wall 38 and the shorter downwardly extending wall 39 are parallel to one another and are spaced apart from one another to receive an upwardly extending wall 40 of the lower clamp member 28. The lower clamp member 28 further includes a bottom horizontal wall 41 and a short upwardly extending wall 42.

FIG. 3 shows a cross-sectional view of a side wall 44 of the truck bed 19, and includes the side wall 44, an outer wall 45 and a top edge 46. An inner wall 47, which terminates at a lip 48, extends downwardly from the top edge 46, and faces the truck bed 19.

To attach the rail system 13 to the side wall 44 of the truck bed 19, the outwardly extending arm 37 of the upper clamp member 26 is inserted into the assembly channel 20 of the rail member 17. The rail member 17 is then placed on the top edge 46 of the side wall 44. A gasket member 50, made from foam rubber or resilient material, may be provided along the length of the bottom surface 51 of the rail member to protect the top edge 46 of the side wall 44.

After positioning the rail member 17, the lower clamp member 28 is fitted to the upper clamp member 26 so that the upwardly extending wall 40 of the lower clamp member 28 fits snugly between the walls 38 and 39 of the upper clamp member 26. The clamp bolt 30 is then inserted through the bolt bore 27 and threaded bore 29, and is tightened to draw the bottom wall 41 up towards the top edge 46 of the side wall 44. An isolator element 52, made from resilient material, is disposed on the lower clamp member 28, in the space between the short wall 42 and the longer, downwardly extending wall 38 of the upper clamp member 26, to prevent damage to the lip 48 and inner wall 47 of the side wall 44. The isolator element also enhances the grip of the lower clamp member 28 with the lip 48 and the inner wall 47 by deforming slightly and thereby conforming to the surfaces of the lip 48 and the inner wall 47.

The upwardly extending wall 40 of the lower clamp member 28 is preferably short enough relative to the walls 38 and 39, and the threaded bore 29 and clamp bolt 30 are long enough, so that upper clamp member 26 and lower clamp member 28 can be drawn together to tightly grip the top edge 46, inner wall 47 and lip 48, without a top surface 54 of the upwardly extending wall 40 abutting the upper clamp member 26, which could limit the ability of the upper clamp member 26 and the lower clamp member 28 from being secured to the side wall 44.

Tucker '719 provides for the use of accessory bars, mounted on the rail members 17, that form part of bicycle or ski racks for externally carried stowage, above the truck bed 19. Such accessory bars and racks permit the truck bed 19 to be covered or uncovered.

As shown in FIGS. 5A and 5B, Tucker attached accessory bars 90 to the rail system 13 by modifying the clamp configuration. An upper clamp member 100 and a lower clamp member 101 are provided that are substantially similar to the upper and lower clamp members 26 and 28, respectively. An accessory adapter 104 having bolt holes 105 is provided. The upper accessory clamp member 100 has bolt holes 107 that align with the bolt holes 105. The upper accessory clamp member 100 and lower accessory clamp member 101 are tightened together with bolts 108 that are inserted through the bolt holes 105 in the accessory adapter 104 and the bolt holes 107 in the upper accessory clamp 100 so that they thread into bores in the lower accessory clamp member 101.

The accessory adapter 104 has a central non-threaded aperture 109, below which is a substantially rectangular slot 150. An nut insert 110 is placed in the slot 150 and is restrained from rotation by the slot 150. The accessory bar 90 is attached to the accessory adapter 104 with bolts 94, which thread into the nut inserts 110. For the bolts 94 to be able to connect with the nut inserts 1 10, the truck bed cover 91 must be provided with an aperture 92. The aperture 92 has a grommet 111 for reinforcement and to prevent moisture or dirt from entering the truck bed 19. The accessory bars 90 can be connected to channel members to support bicycles or cargo, or alternate accessory bars for supporting skis may be employed.

While the rail system of Tucker is well designed to support a cover for a truck bed, the accessory configuration has multiple drawbacks. The accessory adapter system is complex, requiring special accessory clamps, multiple extra parts and additional bolts. The more bolts employed the greater the risk of parts becoming detached.

For the Tucker rail system to work with the accessory bars, the cover must have apertures as discussed above. Such apertures increase the risk that moisture or dirt with enter the covered truck bed.

Perhaps the greatest disadvantage of the Tucker system is that it cannot be used with bicycle, ski or cargo racks already on the market. Racks such as ones manufactured by Yakima® or Touly® have gained wide acceptance in the market, and have a proven degree of reliability. Such racks cannot be used in the Tucker system.

SUMMARY OF THE INVENTION

These and other deficiencies of the prior art are addressed by the present invention which is directed to a bracket for use with a rail assembly installed on the top of a pickup truck bed having a cover mounted thereon to conceal the bed and protect it from the elements. The bracket allows a rack such as ones manufactured by Yakima® or Touly® to be attached above the truck bed when covered or uncovered, providing the unique feature of allowing the user to transport a bicycle or the like while allowing unrestricted access to the bed of the truck by enabling removal of the cover without removing the rail assembly installed above the truck bed. The bracket is intended for use with a rail assembly as set forth in U.S. Pat. Nos. 5,152,574 and 5,261,719 (Tucker).

An object of the present invention is to provide a bracket combined with a rack such as ones manufactured by Yakima® or Touly®, to be attached above the truck bed regardless of whether it is covered or uncovered.

Yet another object of the present invention is to provide a bracket for use with a rail assembly installed on the top of a pickup truck bed that allows a rack, such as ones manufactured by Yakima® or Touly®, to be attached above the truck bed regardless of whether it is covered or uncovered.

Another object of the present invention is to provide a bracket that eliminates the need for apertures or holes in the truck bed cover.

Still another object of the present invention is to provide a bracket for use with a rail system that requires no other additional hardware, except for the bracket itself so as to enable transporting a bicycle or the like without concern for removing the cover protecting the bed of the truck.

The foregoing and other attributes of the present invention will be described with respect to the appended drawings taken in conjunction with the description that follows.

BRIEF DESCRIPTION OF THE DRAWINGS

FIG. 6 is a top view of a utility rack adapter bracket embodying the present invention;

FIG. 7 is a front view of a utility rack adapter bracket shown in FIG. 6, embodying the present invention;

FIG. 8 is a side view of the utility rack adapter bracket shown in FIGS. 6 and 7, embodying the present invention;

FIG. 10 is a perspective view of the utility rack adapter bracket embodying the present invention employed in the prior art Tucker system with a Yakima® rack attached; and FIG. 11 is a perspective view of the utility rack adapter bracket embodying the present invention employed in the prior art Tucker system with a Yakima® rack attached and a cover in place over the truck bed.

DETAILED DESCRIPTION OF THE PREFERRED EMBODIMENT

Figure 1:
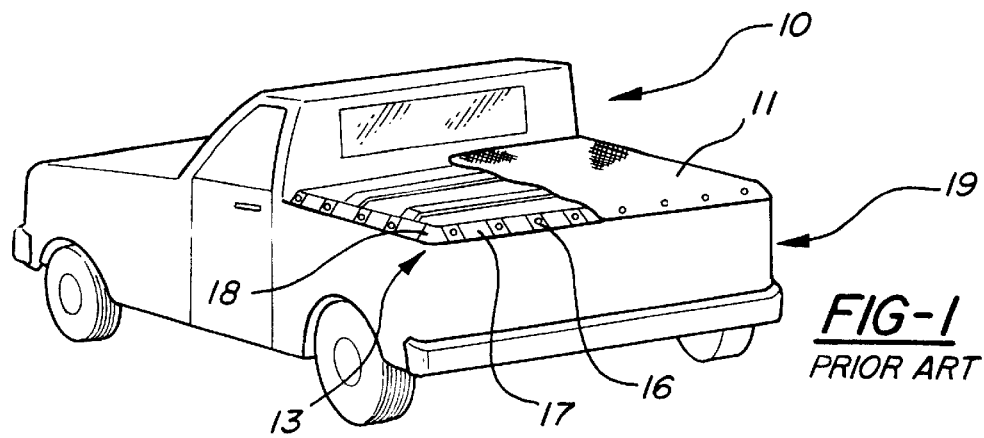
FIG. 1 is a perspective view of a pickup truck, showing a cover, in fragmented view, in place on the truck bed, and further showing the prior art Tucker system for mounting the cover.
Figure 2:
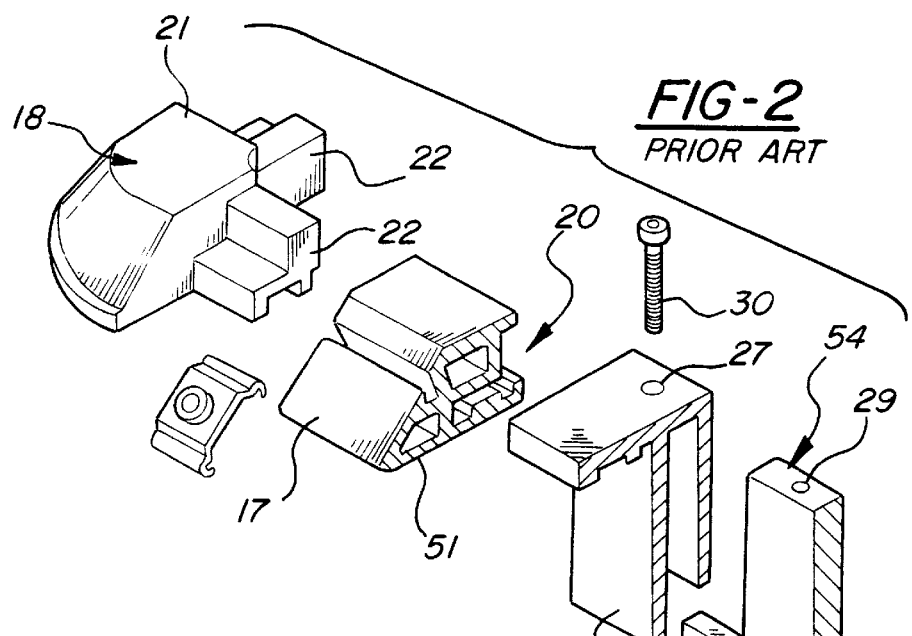
FIG. 2 is a perspective exploded view of some of the components of the prior art Tucker system for mounting a cover.
Figure 3:
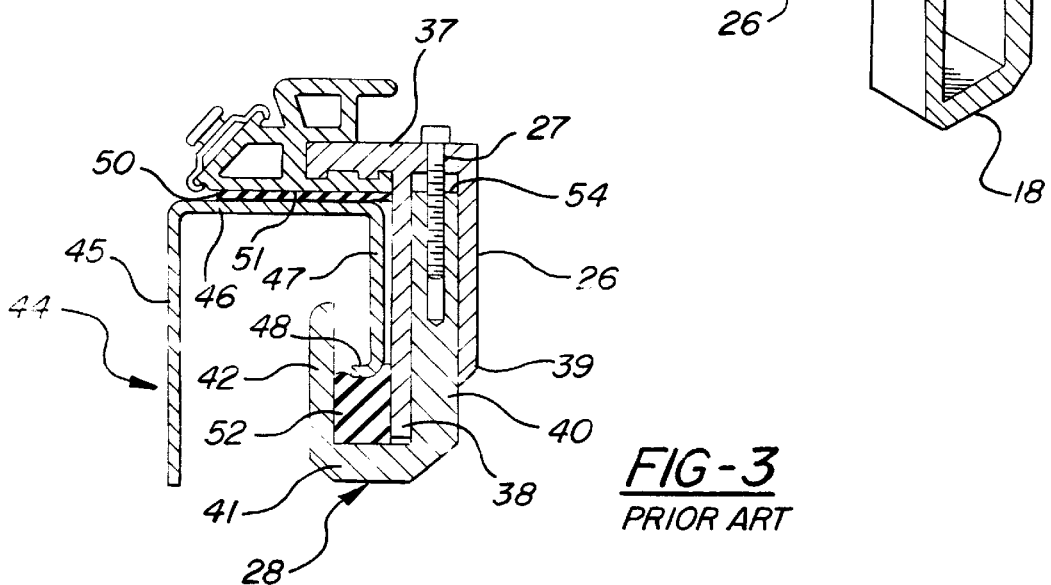
FIG. 3 is a side elevation, in section, of a rail member according to the prior art Tucker system, clamped into place on the side wall of a truck bed.
Figure 4:
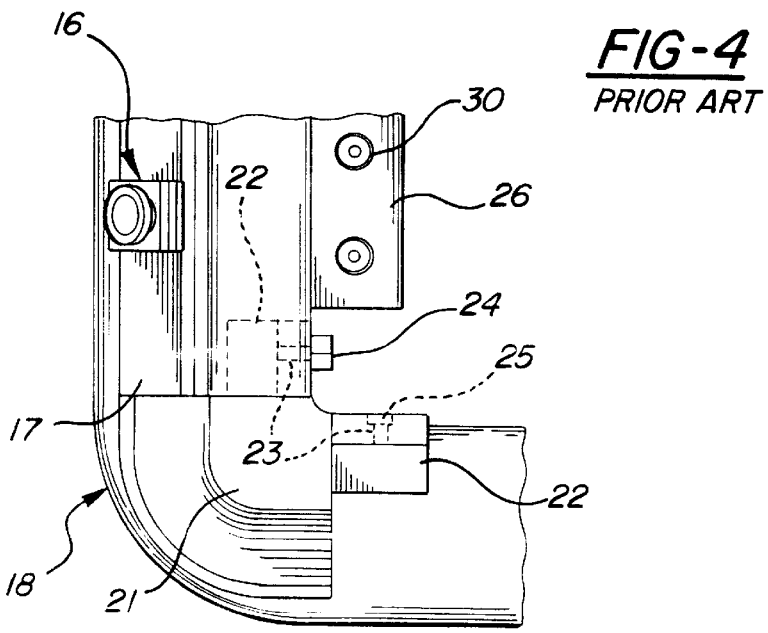
FIG. 4 is a top plan view of a corner assembly for the prior art Tucker rail system.
Figure 5A:
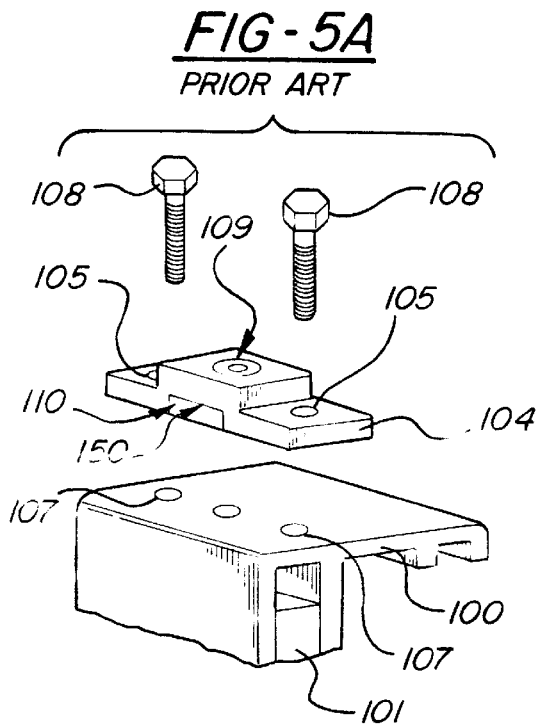
FIG. 5A is a fragmentary perspective view of an accessory clamp and accessory adapter according to the prior art Tucker system.
Figure 5B:
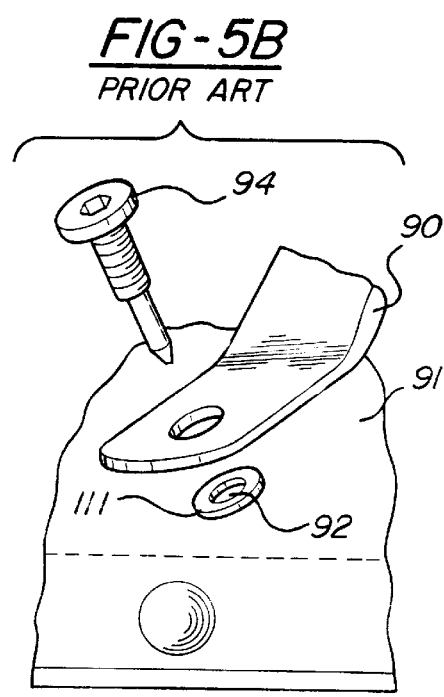
FIG. 5B is a fragmentary perspective view of an end of the cover accessory support bar according to the prior art Tucker system.

Referring to FIGS. 6–8, a bracket 200 according to the present invention is illustrated. The bracket has a first vertical wall 202 and a horizontal surface 204. The first vertical wall 202 and the horizontal surface 204 are formed from a sheet of metal which is bent at a first edge 206 so that the first vertical wall 202 and the horizontal surface 204 meet along the first edge 206 substantially perpendicularly. A second vertical wall 208 is formed on an opposite edge 210 of the horizontal surface 204. The second vertical wall 208 extends from the horizontal surface 204 in a direction opposite the first vertical wall 202, as seen most clearly in FIG. 8. The second vertical wall 208 is formed by bending the metal sheet, so that the first vertical wall 202, the horizontal surface 204, and the second vertical wall 208 are formed from the same sheet of metal.

The ends of the second vertical wall 208 are bent inwards towards the first edge 206 thus forming side walls 212. Referring to FIGS. 6 and 7, the second vertical wall 208 is not as long as the first vertical wall 202. The side walls 212 at either end of the second vertical wall 208 extend over the horizontal surface 204, as shown in FIG. 6.

The use of the bracket 200 in conjunction with the Tucker rail system and a Yakima *) rack will now be described, with reference to FIGS. 9 and 10. Elements forming the Tucker rail system bear the same reference numbers as set forth in the Tucker '719 patent.

Figure 9:
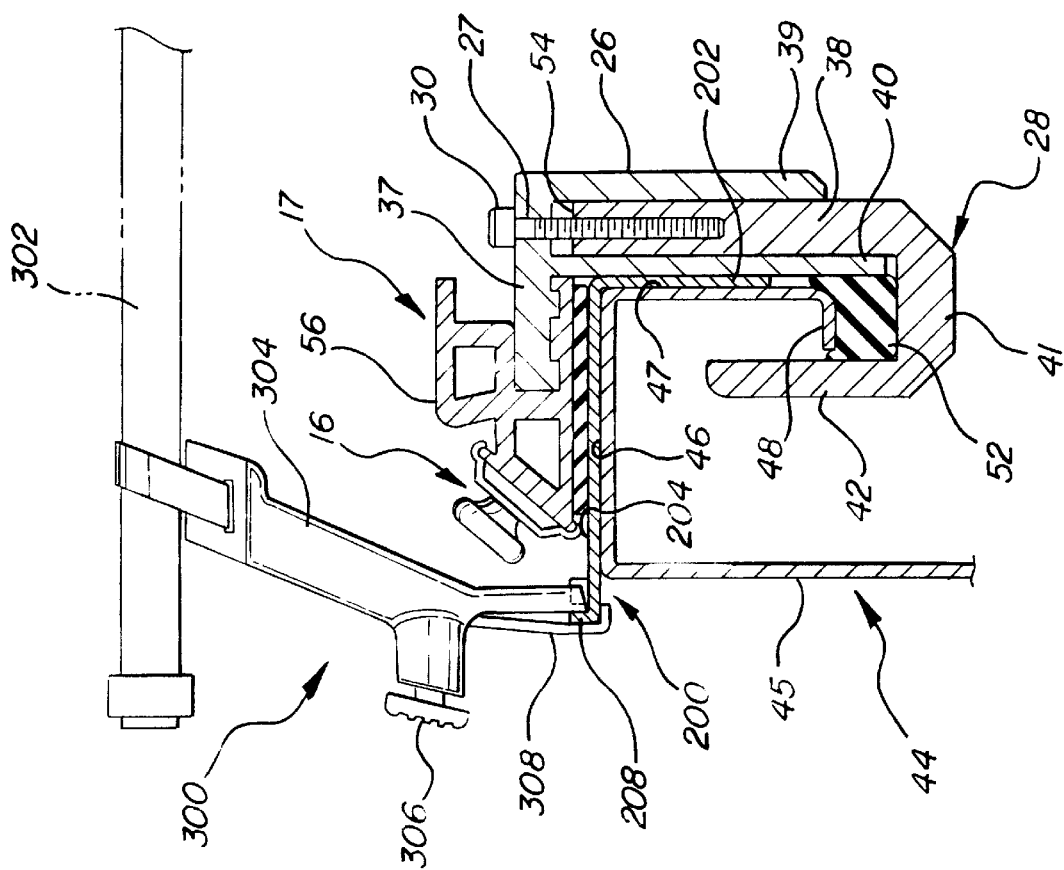
FIG. 9 is a cross-sectional view of a utility rack adapter bracket according to the present invention employed in the prior art Tucker system with a Yakima® rack attached.

In FIG. 9 the side wall 44 of the truck bed 19, including the outer wall 45 and the top edge 46, are shown in cross section. The inner wall 47 extends downwardly from the top edge 46 so that it faces the truck bed 19.

The rail system 13 is attached to the side wall 44 of the truck bed 19 by inserting the outwardly extending arm 37 of the upper clamp member 26 into the assembly channel 20 of the rail member 17. The rail member 17 is then positioned so that the bracket 200 is disposed between the top edge 46 of the side wall 44 and the rail member 17. The gasket member 50, if provided along the length of the bottom surface 51 of the rail member 17, will rest on the top of the horizontal surface 204 of the bracket 200. A second gasket (not shown) may be provided on the bottom of the horizontal surface 204 of the bracket 200 to protect the top edge 46 of the side wall 44.

When the rail member 17 is properly positioned, the lower clamp member 28 can be fitted to the upper clamp member 26 so that the upwardly extending wall 40 of the lower clamp member 28 fits snugly between the walls 38 and 39 of the upper clamp member 26. The clamp bolt 30 is then inserted through the bolt bore 27 and threaded bore 29, and is tightened to draw the bottom horizontal wall 41 up toward the top edge 46 of the side wall 44. In this manner the first vertical wall 202 is sandwiched between the inner wall 47 of the side wall 44 and the longer downwardly extending wall 38 of the upper clamp member 26.

The isolator element 52 is disposed on the lower clamp member 28, in the space between the short upwardly extending wall 42 and the downwardly extending wall 38 of the upper clamp member 26, to prevent damage to the lip 48 and the inner wall 47 of the side wall 44. As the upper clamp member 26 and lower clamp member 28 are drawn together to tightly grip the top edge 46, inner wall 47 and lip 48, the horizontal surface 204 of the bracket 200 is sandwiched between the rail member 17 and the top edge 46 of the side wall 44. As a result of tightening the bolts, the bracket 200 is securely held in place between the side wall 44 and the combination of the upper clamp member 26 and the rail member 17. No extra screws or bolts are needed to secure the bracket 200.

As shown in both FIGS. 9 and 10, the horizontal surface 204 extends outwardly beyond the rail member 17 of the Tucker rail system. The horizontal surface 204 is designed to provide sufficient distance between the male snap members 16 and a utility rack 300, so that the cover 11 can be installed or removed without interference from the rack 300.

The rack 300, illustrated in FIGS. 9–11, is a Yakima® rack, and has a crossbar 302 that is supported by vertically oriented arms 304. In prior art use the arms 304 are extended to be positioned at the edges of a roof of a passenger car vehicle. More specifically, the arms 304 are attached to the drip molding which typically is located where the doors of the vehicle meet the roof. Each arm 304 has a clamp 308 and a locking mechanism 306. The clamp 308 is hooked so that a portion of it can grip the underside of the drip molding or roof edge. The gap between the roof and the door surrounds the bottom of the arms 304 so as to provide stability as the clamp 308 grabs the roof.

In use with the bracket 200 of the present invention, the arms 304 of the Yakima® rack are held in position by the second vertical wall 208 and the side walls 212. The second vertical wall 208 constrains the arm 304 from any outward movement, while the side walls 212 brace the sides of the bottom of the arms 304 against forward or rearward movement. The clamp 308 is used to grip the bottom of the horizontal surface 204, and is tightened using the locking mechanism 306.

As can be appreciated from FIG. 11, the bracket 200 allows the rack 300 to be attached to the rail system in such a manner that the cover 11 can be attached and removed without interference. No holes in the cover 11 are required to permit the use of an accessory rack system. The simple construction of the bracket 200 eliminates the need for additional bolts or screws, and provides a simple elegant device for utilizing existing racks with the rail system of Tucker. The entire truck bed is accessible even when the rack 300 is attached, unlike the Tucker '719 system.

Having described several embodiments of the utility rack adapter bracket in accordance with the present invention, it is believed that other modifications, variations and changes will be suggested to those skilled in the art in view of the description set forth above. For example, the configuration of the second vertical wall and the side walls can be altered to accommodate other rack designs. The bracket 200 may have a resilient pad underneath the horizontal surface to protect the side wall 44 of the truck bed. Furthermore, the bracket may be used without the rail system where the bracket is clamped to the side walls of the truck bed with clamps similar to the upper and lower clamping members. It is therefore to be understood that all such variations, modifications and changes are believed to fall within the scope of the invention as defined in the appended claims.

What is claimed is:

1. A bracket for attaching a utility rack, having a pair of vertically oriented arms, to an apparatus for attaching a cover to an open topped vehicle enclosure, said enclosure having a plurality of enclosure side walls, each enclosure side wall comprising an outer wall portion, a top wall portion extending substantially horizontally and inwardly from said outer wall portion, and an inner wall portion extending substantially vertically and downwardly from said top wall portion, said attaching apparatus comprising at least two parallel rail members, and clamping means for respectively attaching said at least two parallel rail members to two of said plurality of enclosure side walls, said bracket comprising:

a horizontal surface;

a first vertical wall extending substantially perpendicularly from said horizontal surface along a first edge;

a second vertical wall extending substantially perpendicularly from a second opposite edge of said horizontal surface, said second vertical wall extending from said horizontal surface in a direction opposite said first vertical wall; and a pair of side walls, one each extending from an end of said second vertical wall towards said first vertical wall;

said first vertical wall adapted to be disposed between said inner wall portion of one of said enclosure side walls and said clamping means of said attaching apparatus, said horizontal surface adapted to be disposed between said top wall portion of one of said enclosure side walls and one of said at least two parallel rail members;

said second vertical wall and said pair of side walls constraining one of said pair of vertically oriented arms of said utility rack against movement.

2. A bracket for attaching a utility rack to an apparatus for attaching a cover to a vehicle enclosure as recited in claim 1, wherein said horizontal surface, said first vertical wall, said second vertical wall, and said pair of side walls are formed from a single sheet of metal.

3. A bracket for attaching a utility rack to an apparatus for attaching a cover to a vehicle enclosure as recited in claim 1, wherein said enclosure is a truck bed of a pickup truck.

4. A bracket for attaching a utility rack to an apparatus for attaching a cover to a vehicle enclosure as recited in claim 1, wherein said clamping means comprises an upper clamping member interlockable with one of said at least two parallel rail members, a lower clamping member that grips a lower edge of said inner wall portion of each said enclosure side wall, said upper clamping member and said lower clamping member being attached to one another and moveable relative to one another;

wherein said first vertical wall of said bracket is disposed between said inner wall portion of each said enclosure side wall and said upper clamping member.

5. A bracket for attaching a utility rack to an apparatus for attaching a cover to a vehicle enclosure as recited in claim 4, wherein said upper clamping member includes a downwardly extending wall and said first vertical wall of said bracket is disposed between said inner wall portion of each said enclosure side wall and said downwardly extending wall of said upper clamping member.

6. A bracket for attaching a utility rack to an apparatus for attaching a cover to a vehicle enclosure as recited in claim 1, wherein said horizontal surface extends outwardly from each said enclosure side wall so that said cover is attachable or removable from said attaching apparatus without interference from said rack.

7. A bracket for attaching a utility rack to an apparatus for attaching a cover to a vehicle enclosure as recited in claim 1, wherein said rack comprises a crossbar attached to said pair of vertically oriented arms;

wherein a bottom portion of one of said pair arms of said pair of vertically oriented arms is adapted to be disposed on said horizontal surface of said bracket with said second vertical wall and said side walls constraining said bottom portion of one of said arms of said pair of vertically oriented arms.

8. A bracket for attaching a utility rack to an apparatus for attaching a cover to a vehicle enclosure as recited in claim 7, wherein said rack further comprises a clamp and a locking mechanism on each arm of said pair of vertically oriented arms;

wherein said clamp on said one arm is adapted to grip a bottom face of said horizontal surface of said bracket and is tightened by said locking mechanism.

9. A bracket for attaching a utility rack to an apparatus for attaching a cover to a vehicle enclosure as recited in claim 7, wherein said second vertical wall of said bracket is adapted to constrain said one arm of said pair of vertically oriented arms of said rack against outward movement.

10. A bracket for attaching a utility rack to an apparatus for attaching a cover to a vehicle enclosure as recited in claim 7, wherein said pair of side walls of said bracket are configured to brace said bottom portion of said one arm of said pair of vertically oriented arms against forward and rearward movement.

11. A bracket for attaching a utility rack having a pair of vertically oriented arms, to an apparatus for attaching a cover to an open topped vehicle enclosure, said enclosure having a plurality of enclosure side walls, each enclosure side wall comprising an outer wall portion, a top wall portion extending substantially horizontally and inwardly from said outer wall portion, and an inner wall portion extending substantially vertically and downwardly from said top wall portion, said attaching apparatus comprising at least two parallel rail members and clamping means for respectively attaching said at least two parallel rail members to two of said plurality of enclosure side walls, said bracket comprising:

a horizontal surface;

a first vertical wall extending substantially perpendicularly from said horizontal surface along a first edge;

a second vertical wall extending substantially perpendicularly from a second opposite edge of said horizontal surface, said second vertical wall extending from said horizontal surface in a direction opposite said first vertical wall; and a pair of side walls, one each extending from an end of said second vertical wall towards said first vertical wall;

said horizontal surface of said bracket being adapted to be disposed between said top wall portion of each said enclosure side walls and one of said at least two parallel rail members;

said second vertical wall and said pair of side walls adapted to constrain one of said pair of vertically oriented arms of said utility rack against movement;

said clamping means comprises an upper clamping member interlockable with one of said at least two parallel rail members and a lower clamping member that grips a lower edge of said inner wall portion of each said enclosure side wall, said upper clamping member and said lower clamping member being attached to one another and moveable relative to one another;

wherein said upper clamping member includes a downwardly extending wall and said first vertical wall of said bracket is adapted to be disposed between said inner wall portion of said enclosure side wall and said downwardly extending wall of said upper clamping member;

said horizontal surface extending outwardly from each said enclosure side wall so that said cover is attachable or removable from said attaching apparatus without interference from said rack.

12. A bracket for attaching a utility rack to an apparatus for attaching a cover to a vehicle enclosure as recited in claim 11, wherein said horizontal surface, said first vertical wall, said second vertical wall, and said pair of side walls are formed from a single sheet of metal.

13. A bracket for attaching a utility rack to an apparatus for attaching a cover to a vehicle enclosure as recited in claim 11, wherein said enclosure is a truck bed of a pickup truck.

14. A bracket for attaching a utility rack to an apparatus for attaching a cover to a vehicle enclosure as recited in claim 11, wherein said rack comprises:

a crossbar and said pair of vertically oriented arms;

wherein a bottom portion of one of said pair of vertically oriented arms is adapted to be disposed on said horizontal surface of said bracket with said second vertical wall and said pair of side walls configured to constrain said bottom portion of said one arm of said pair of vertically oriented arms.

15. A bracket for attaching a utility rack to an apparatus for attaching a cover to a vehicle enclosure as recited in claim 14, wherein said rack further comprises a clamp and a locking mechanism on each arm of said pair of vertically oriented arms;

wherein said clamp associated with said one arm is adapted to grip a bottom face of said horizontal surface of said bracket and is tightened by said locking mechanism.

16. A bracket for attaching a utility rack to an apparatus for attaching a cover to a vehicle enclosure as recited in claim 14, wherein said second vertical wall of said bracket constrains said one arm of said pair of vertically oriented arms of said utility rack against outward movement.

17. A bracket for attaching a utility rack to an apparatus for attaching a cover to a vehicle enclosure as recited in claim 14, wherein said pair of side walls of said bracket are adapted to brace said bottom portion of said one arm of said pair of vertically oriented arms against forward and rearward movement.

18. A bracket for attaching a utility rack, having a pair of vertically oriented arms, to an apparatus for attaching a cover to an open topped vehicle enclosure, said enclosure having a plurality of enclosure side walls, each enclosure side wall comprising an outer wall portion, a top wall portion extending substantially horizontally and inwardly from said outer wall portion, and an inner wall portion extending substantially vertically and downwardly from said top wall portion, said attaching apparatus comprising at least two parallel rail members and clamping means for respectively attaching said at least two parallel rail members to two of said plurality of enclosure side walls, said bracket comprising:

a horizontal surface;

a first vertical wall extending substantially perpendicularly from said horizontal surface along a first edge;

a second vertical wall extending substantially perpendicularly from a second opposite edge of said horizontal surface, said second vertical wall extending from said horizontal surface in a direction opposite said first vertical wall; and a pair of side walls, one each extending from an end of said second vertical wall towards said first vertical wall;

said horizontal surface of said bracket adapted to be disposed between said top wall portion of each said enclosure side walls and one of said at least two parallel rail members;

said second vertical wall and said pair of side walls adapted to constrain one of said pair of vertically oriented arms of said utility rack against movement;

said clamping means comprises an upper clamping member interlockable with one of said at least two parallel rail members and a lower clamping member that grips a lower edge of said inner wall portion of said enclosure side wall, said upper clamping member and said lower clamping member being attached to one another and moveable relative to one another;

wherein said upper clamping member includes a downwardly extending wall and said first vertical wall of said bracket is adapted to be disposed between said inner wall portion of said enclosure side wall and said downwardly extending wall of said upper clamping member;

said horizontal surface extends outwardly from each said enclosure side wall so that said cover attachable or removable from said attaching apparatus without interference from said rack;

wherein said utility rack comprises:

a crossbar, said pair of vertically oriented arms, a clamp and a locking mechanism on each arm of said pair of vertically oriented arms;

wherein a bottom portion of one of said pair of vertically oriented arms is adapted to be disposed on said horizontal surface of said bracket with said second vertical wall and said pair of side walls configured to constrain said bottom portion of said one arm of said pair of vertically oriented arms, and said clamp is adapted to grip a bottom face of said horizontal surface of said bracket and is tightened by said locking mechanism, and wherein said second vertical wall of said bracket is adapted to constrain said one arm of said pair of vertically oriented arms of said rack against outward movement, and said pair of side walls of said bracket are configured to brace said bottom portion of said one arm of said pair of vertically oriented arms against forward and rearward movement.

19. A bracket for attaching a utility rack to an apparatus for attaching a cover to a vehicle enclosure as recited in claim 18, wherein said horizontal surface, said first vertical wall, said second vertical wall, and said pair of side walls are formed from a single sheet of metal.

20. A bracket for attaching a utility rack to an apparatus for attaching a cover to a vehicle enclosure as recited in claim 18, wherein said enclosure is a truck bed of a pickup truck.

* * * * *

UNITED STATES PATENT AND TRADEMARK OFFICE
CERTIFICATE OF CORRECTION

PATENT NO : 6,059,159
DATED : May 9, 2000
INVENTOR(S) : Thomas L. Fisher

It is certified that error appears in the above-identified patent and that said Letters Patent are hereby corrected as shown below:

Column 2, line 5, delete "member s" and insert ----members----.

Column 3, line 24, delete "An" and insert ----A----.

Column 3, line 28, delete "1 10" and insert ----110----.

Column 3, line 43, delete "with" and insert ----will----.

Column 5, line 17, delete "*)" and insert ----®----.

Column 6, line 58, delete "members," and insert ----members----.

UNITED STATES PATENT AND TRADEMARK OFFICE
CERTIFICATE OF CORRECTION

PATENT NO : 6,059,159
DATED : May 9, 2000
INVENTOR(S) : Thomas L. Fisher

It is certified that error appears in the above-identified patent and that said Letters Patent are hereby corrected as shown below:

Column 7, line 52, delete "pair".

Column 8, line 35, delete ----being----.

Column 9, line 5, after "one" insert ----arm----.

Column 10, line 22, after "cover" insert ----is----.

Column 10, line 29, delete "of one" and insert ----of said one arm----.

Column 10, line 37, delete the comma "," and insert a semi-colon ----;----.

Signed and Sealed this

Twenty-second Day of May, 2001

Attest:

NICHOLAS P. GODICI

Attesting Officer

Acting Director of the United States Patent and Trademark Office